(12) United States Patent
Prabhakar et al.

(10) Patent No.: US 8,950,737 B2
(45) Date of Patent: Feb. 10, 2015

(54) ANTIVIBRATION DEVICE

(75) Inventors: Soma Prabhakar, Kurashiki (JP); Takashi Nishie, Kurashiki (JP)

(73) Assignee: Kurashiki Kako Co., Ltd., Kurashiki-shi (JP)

( * ) Notice: Subject to any disclaimer, the term of this patent is extended or adjusted under 35 U.S.C. 154(b) by 3 days.

(21) Appl. No.: 13/297,335

(22) Filed: Nov. 16, 2011

(65) Prior Publication Data

US 2012/0146269 A1 Jun. 14, 2012

(30) Foreign Application Priority Data

Dec. 13, 2010 (JP) ................................. 2010-276752

(51) Int. Cl.
*F16F 7/00* (2006.01)
*F16F 3/087* (2006.01)

(52) U.S. Cl.
CPC .................................... *F16F 3/0873* (2013.01)
USPC ..................... 267/141; 267/141.7; 267/140.5; 267/140.3

(58) Field of Classification Search
CPC ..................................................... F16F 3/0873
USPC ........ 267/141, 141.1, 141.2, 141.3, 292, 293, 267/140.11, 140.13, 141.7
See application file for complete search history.

(56) References Cited

U.S. PATENT DOCUMENTS

| | | | | |
|---|---|---|---|---|
| 2,036,361 A | * | 4/1936 | Sann et al. | 213/9 |
| 3,171,622 A | * | 3/1965 | Tolan, Jr. | 248/635 |
| 4,930,758 A | * | 6/1990 | Poirier | 267/292 |
| 6,213,455 B1 | * | 4/2001 | Kato et al. | 267/141.2 |
| 7,354,031 B2 | * | 4/2008 | Okanaka et al. | 267/140.12 |
| 7,549,620 B2 | * | 6/2009 | Kang | 267/141 |
| 2002/0195758 A1 | * | 12/2002 | Yamamoto et al. | 267/140.11 |
| 2006/0022390 A1 | * | 2/2006 | Arakawa et al. | 267/140.11 |
| 2009/0230601 A1 | * | 9/2009 | Lenda | 267/141.1 |

FOREIGN PATENT DOCUMENTS

| | | | | |
|---|---|---|---|---|
| JP | 59029830 A | * | 2/1984 | |
| JP | 01242838 A | * | 9/1989 | |
| JP | 05302636 A | * | 11/1993 | |
| JP | 201 01 01 37 | * | 5/2010 | |
| JP | 2010-101375 | | 5/2010 | |
| JP | 2010180930 A | * | 8/2010 | |

* cited by examiner

*Primary Examiner* — Robert A Siconolfi
*Assistant Examiner* — Charles Poon
(74) *Attorney, Agent, or Firm* — Gerald E. Hespos; Michael J. Porco; Matthew T. Hespos

(57) ABSTRACT

An antivibration device (1) has a vehicle body-side fixing member (3) adapted to be fixed to a vehicle body. A shaft (6) extends to couple between a pair of sidewalls (11) of the vehicle body-side fixing member (3). An engine-side fixing member (2) is adapted to be fixed to an engine and is provided between the sidewalls (11) to surround around the shaft (6). An elastomer stopper (5) is provided integrally on an inner surface of the engine-side fixing member (2) to define an annular stopper surface (20) that surrounds the shaft (6) while leaving a given gap therebetween. An elastomer mount body (4) couples a base (10) of the vehicle body-side fixing member (3) and the engine-side fixing member (2) together. The antivibration device (1) adequately absorbs a vibrational load applied from the engine in various directions, while ensuring compactness.

6 Claims, 7 Drawing Sheets

ANTIVIBRATION DEVICE

BACKGROUND OF THE INVENTION

1. Field of the Invention

The present invention relates to an antivibration device designed to be provided between an engine and a vehicle body so as to mount the engine on the vehicle body while dampening vibration of the engine.

2. Description of the Related Art

As the above antivibration device, there has been known one type as disclosed, for example, in JP 2010-101375A. An antivibration device disclosed in JP 2010-101375A comprises a rubber mount body for supporting an engine to allow it to be mounted on a vehicle, while dampening vibration of the engine, a stopper bracket attached to a lower portion of the mount body, and a casing which houses the mount body to cover it from thereabove, and has an opening on a bottom side thereof. Each of longitudinally opposite ends of the stopper bracket is provided with a stopper rubber portion disposed in spaces-apart relation to a respective one of opposed sidewall portions (opposed peripheral edge portions of the bottom opening) of the casing by a given distance. The antivibration device is configured such that, when the own weight of the engine (static load) is applied thereto, respective distances between the stopper rubber portions and corresponding ones of the sidewall portions of the casing become approximately equal to each other, whereby an allowable amount of displacement of the mount body can be equally ensured in longitudinally opposite directions of the stopper bracket.

On the other hand, when a fairly large vibrational load (dynamic load) is input from the engine, for example, during vehicle running on a rough road, the mount body is largely deformed, and the sidewall portions of the casing are brought into contact with corresponding ones of the stopper rubber portions, so that it becomes possible to prevent the mount body from being further deformed.

In the above situation where the sidewall portions of the casing are brought into contact with corresponding ones of the stopper rubber portions, vibration of the engine is directly transmitted to a vehicle body. Thus, in view of suppressing vibration to be transmitted into a passenger compartment, it is desirable to ensure a gap (stopper gap) between each of the sidewall portions and a corresponding one of the stopper rubber portions as large as possible. However, in order to increase the stopper gap, it becomes necessary to increase a distance between the sidewall portions (an area of the bottom opening of the casing), which undesirably leads to an increase in size of the casing and thus an increase in size of the antivibration device. In an engine compartment where the antivibration device is provided, various units are disposed in adjacent relation to each other. Thus, the increase in size of the antivibration device is undesirable in terms of layout of the units within the engine compartment.

Moreover, in the antivibration device disclosed in JP 2010-101375A, for example, when a large load causing the mount body to be pulled in an upward-downward direction is applied thereto, the mount body is stretchably deformed in the upward-downward direction, and accordingly the sidewall portions of the casing are likely to be moved beyond or above the stopper rubber portions. If such a situation occurs, it becomes impossible to restrict the displacement of the mount body, so that the mount body is likely to be excessively deformed due to a large load momentarily applied thereto during vehicle running on a rough road, etc., which leads to breaking.

SUMMARY OF THE INVENTION

In view of the above circumstances, it is an object of the present invention to provide an antivibration device capable of adequately absorbing a vibrational load applied from an engine thereto in various directions, while ensuring compactness.

In order to achieve the above object, the present invention provides an antivibration device designed to be provided between an engine and a vehicle body so as to mount the engine on the vehicle body while dampening vibration of the engine. The antivibration device comprises: a vehicle body-side fixing member which has a base portion adapted to be fixed to the vehicle body, and a pair of sidewall portions provided to protrude from the base portion in mutually opposed relation; a shaft member which extends to couple between the pair of sidewall portions of the vehicle body-side fixing member; an engine-side fixing member adapted to be fixed to the engine and provided between the pair of sidewall portions to surround around the shaft member; an elastomer stopper member integrally provided on an inner surface of the engine-side fixing member to define an annular stopper surface composed of a surrounding surface which surrounds the shaft member while leaving a given gap therebetween; and an elastomer mount body provided to couple the base portion of the vehicle body-side fixing member and the engine-side fixing member together.

DESCRIPTION OF THE PREFERRED EMBODIMENT

Figure 1:
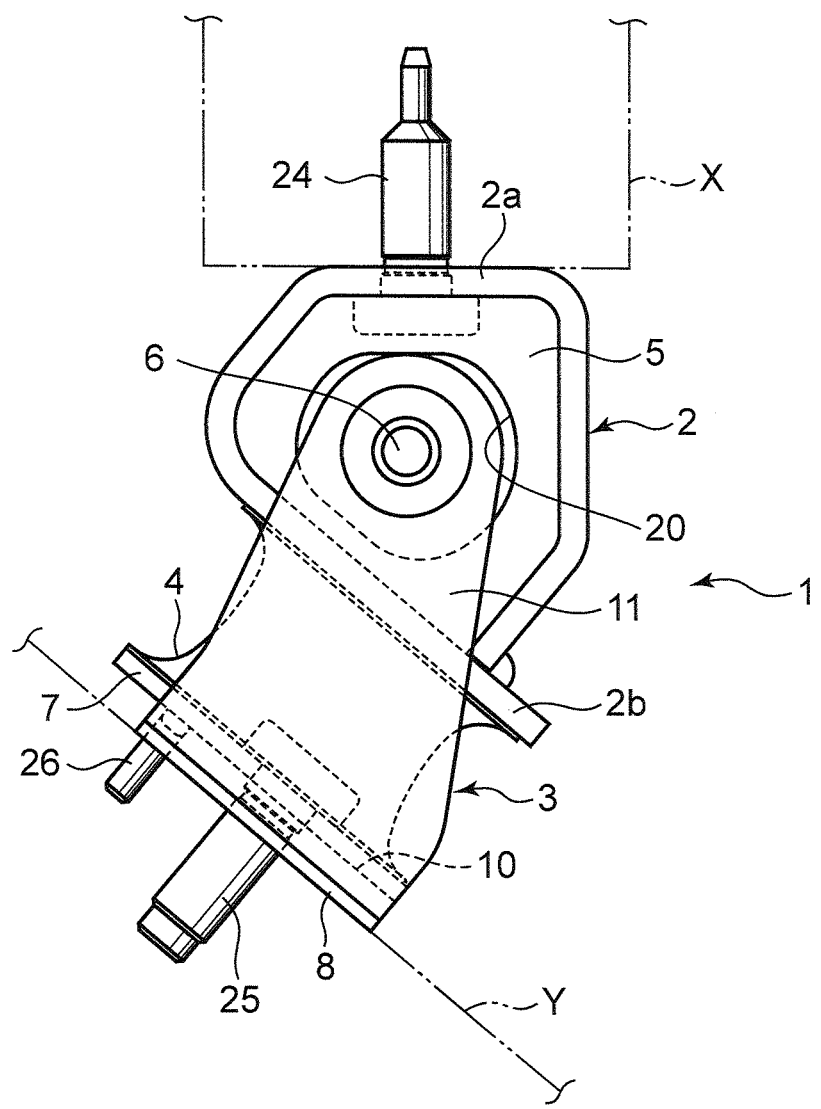
FIG. 1 is a side view of an antivibration device according to one embodiment of the present invention.
Figure 2:
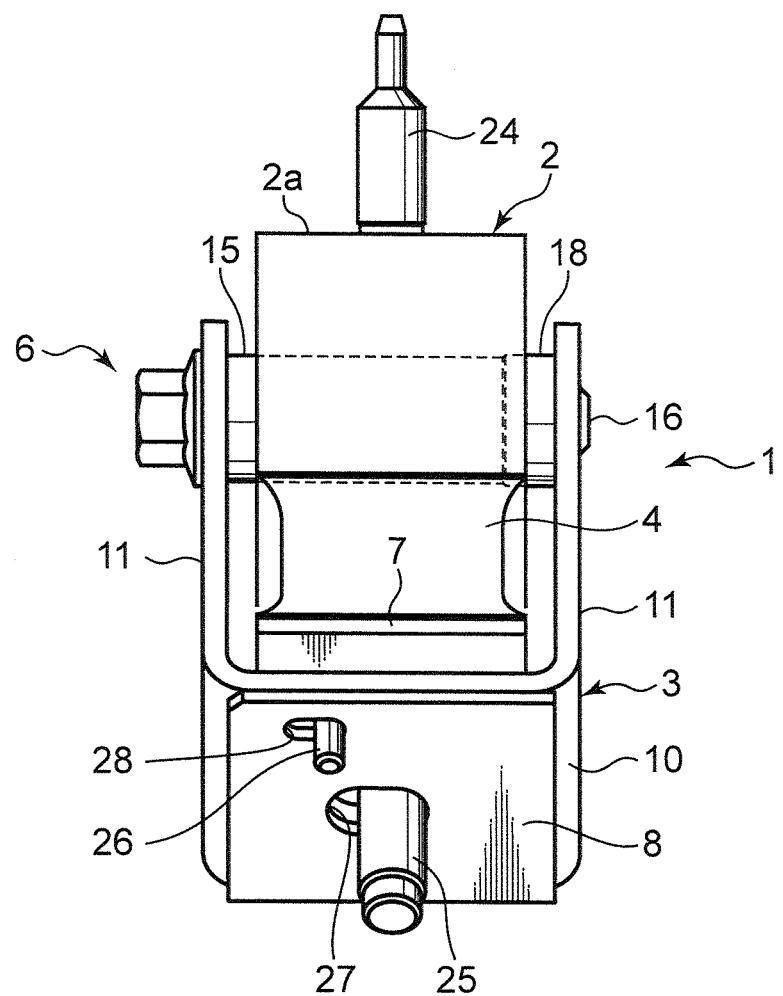
FIG. 2 is a front view of the antivibration device.
Figure 3:
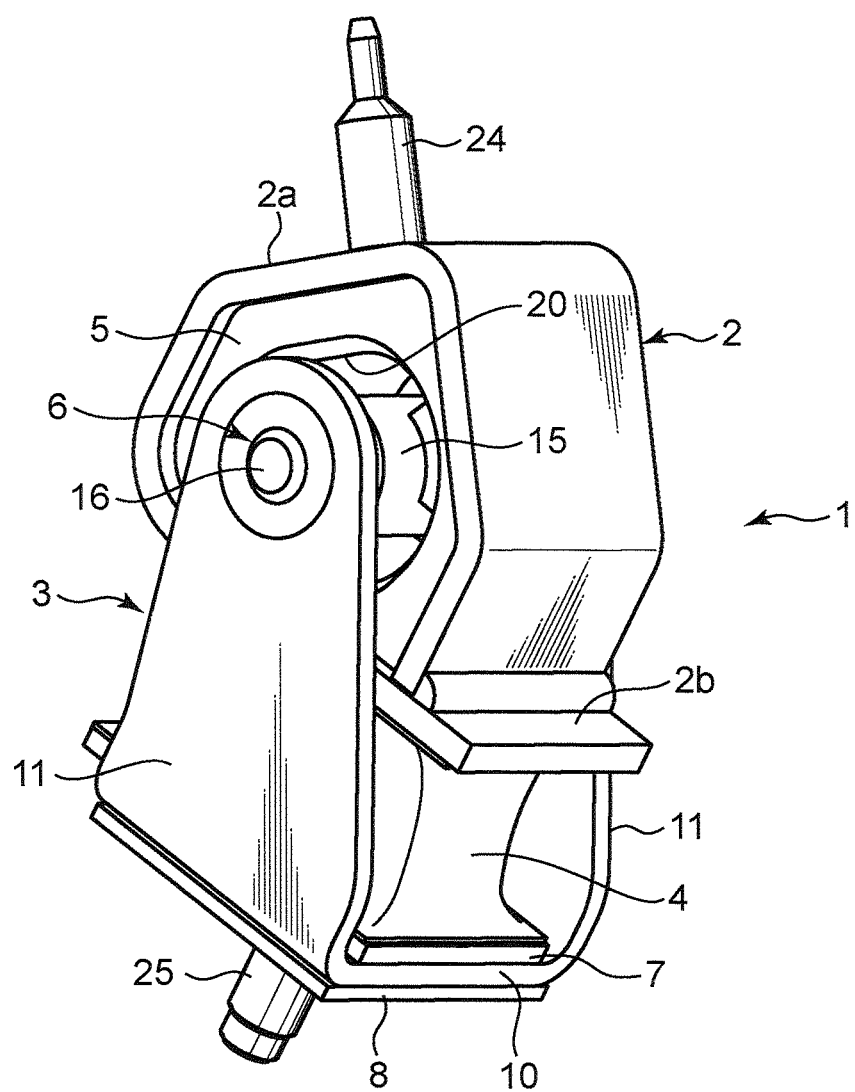
FIG. 3 is a perspective view of the antivibration device.
Figure 4:
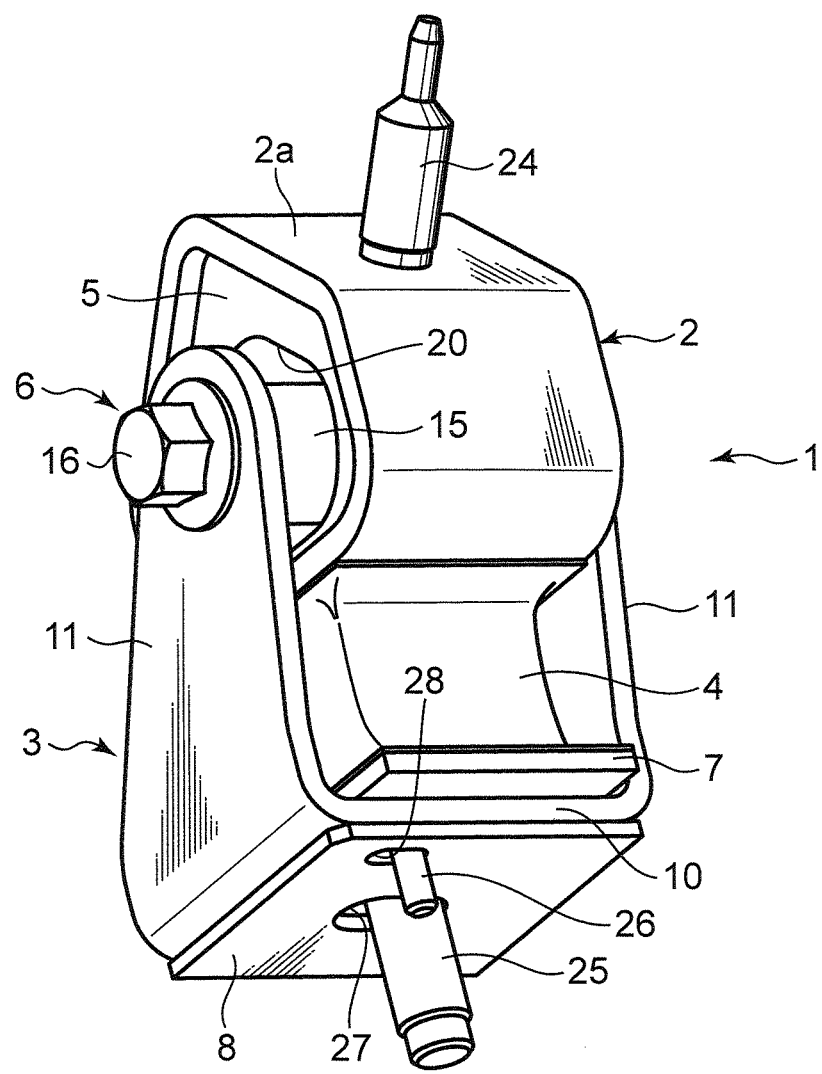
FIG. 4 is a perspective view of the antivibration device, when viewed from another angle.

FIGS. 1 to 5 illustrate an antivibration device 1 according to one embodiment of the present invention. The antivibration device 1 illustrated in these figures is designed to be provided between a non-illustrated engine and a vehicle body so as to mount the engine on the vehicle body while dampening vibration of the engine. In the embodiment illustrated in FIG. 1, the antivibration device 1 is provided between an engine-side member X composed, for example, of a bracket provided on the engine, and a vehicle body-side member Y composed of a vehicle body frame (strengthening member) within an engine compartment, so that the engine is supported with respect to the vehicle body through the antivibration device 1.

The antivibration device 1 comprises an upper frame 2 (which is equivalent to "engine-side fixing member" set forth in the appended claims) adapted to be fixed to the engine-side member X, a lower frame 3 (which is equivalent to "vehicle body-side fixing member" set forth in the appended claims) adapted to be fixed to the vehicle body-side member Y, and a mount body 4 made of an elastomer and provided to couple the upper frame 2 and the lower frame 3 together. As used in this specification, the term "elastomer" collectively means rubber-like elastic bodies, and conceptually includes both rubber (natural rubber and synthetic rubber) and thermoplastic elastomer (resin having elasticity).

The lower frame 3 is prepared by bending a metal plate into an angular C shape. Specifically, the lower frame 3 has a flat plate-shaped base portion 10 adapted to be fixed to the vehicle body-side member Y, and a pair of sidewall portions 11 provided to protrude upwardly from respective ones of widthwise opposite ends of the base portion 10 in mutually opposed relation. A flat plate-shaped washer plate 8 is integrally attached to a lower surface of the base portion 10 by means of welding or the like.

A shaft member 6 is attached to the lower frame 3 to couple respective upper ends of the pair of sidewall portions 11 together. The shaft member 6 comprises a hollow cylindrical-shaped inner pipe 15 disposed between the pair of sidewall portions 11, and a bolt 16 (which is equivalent to "rod-shaped fastening member" set forth in the appended claims) inserted in the inner pipe 15. The bolt 16 has an axially intermediate portion inserted in the inner pipe 15, and opposite ends each fixed to a respective one of the pair of sidewall portions 11.

Specifically, a through-hole 17 (FIG. 8) is provided in one of the pair of sidewall portions 11, and a weld nut 18 (FIGS. 2 and 8) is weldingly fixed onto an inner surface of the other sidewall portion 11. Then, the inner pipe 15 is disposed between an inner surface of the one sidewall portion 11 and the weld nut 18. In this state, a shank of the bolt 16 is inserted into the through-hole 17 and the inner pipe 15, and a distal end of the bolt 16 is screwed into the weld nut 18, so that the opposite ends of the bolt 16 are fixed to respective ones of the pair of sidewall portions 11.

The upper frame 2 is composed of a frame-shaped member surrounding around the shaft member 6. Specifically, the upper frame 2 is prepared by bending a metal plate to define a closed space on an inner peripheral side thereof. In the illustrated embodiment, the upper frame 2 is formed to surround the shaft member 6 by bending a metal plate into a generally pentagonal shape and then weldingly joining opposite ends thereof together.

Figure 5:
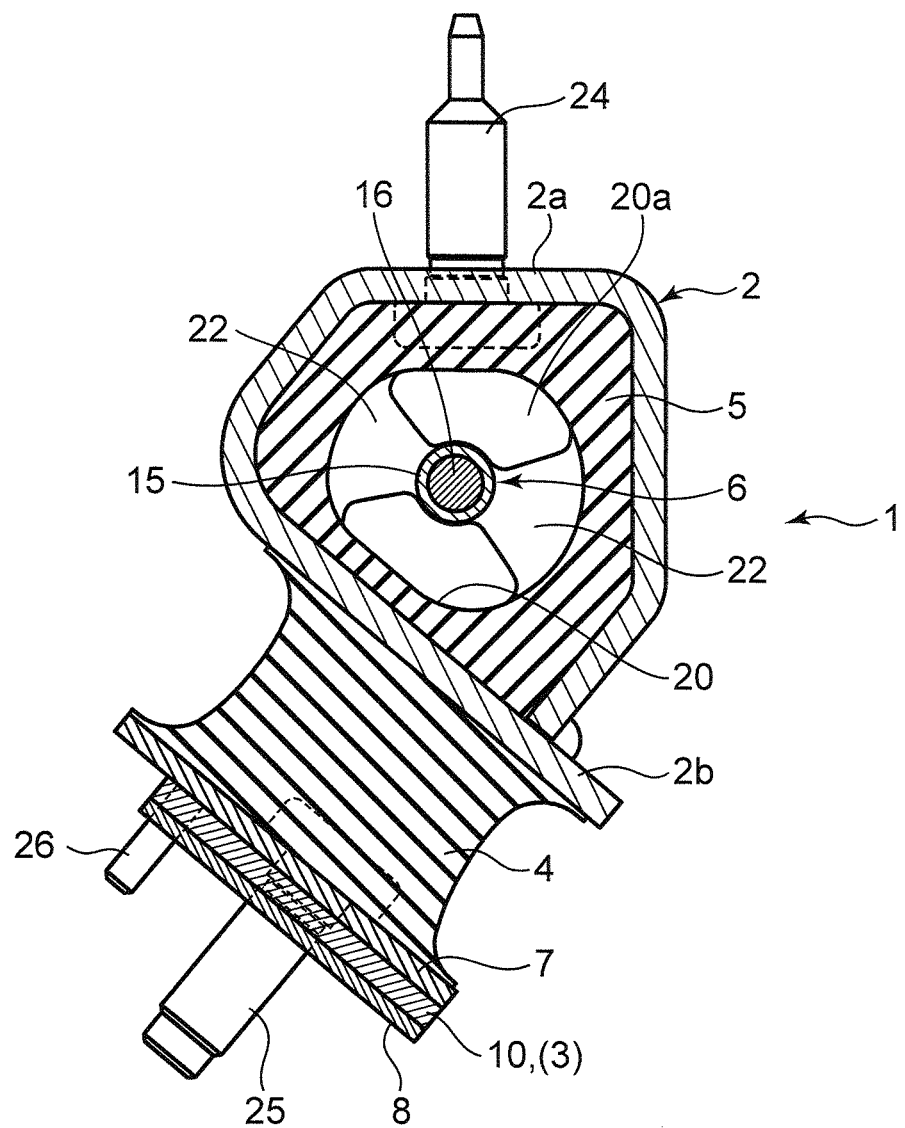
FIG. 5 is a sectional view of the antivibration device.

A stopper member 5 made of the same elastomer as that of the mount body 4 is integrally formed on an inner surface of the upper frame 2. As is best illustrated in FIG. 5, the stopper member 5 is formed in an annular shape to occupy an internal space of the upper frame 2, except for a given region (generally circular region) around a central axis thereof. This cross-sectionally circular space surrounded by the stopper member 5 will hereinafter be referred to as "open hole 20a".

The shaft member 6 is inserted in the open hole 20a. Specifically, an inner peripheral surface of the stopper member 5 defining the open hole 20a is formed as a surrounding surface which surrounds the shaft member 6 while leaving a given gap therebetween. The surrounding surface of the stopper member 5 surrounding the shaft member 6 will hereinafter be referred to as "annular stopper surface 20".

As illustrated in FIG. 5, a support body 22 is provided between the annular stopper surface 20 of the stopper member 5 and the inner pipe 15 of the shaft member 6 to couple the stopper member 5 and the inner pipe 15 together. The support body 22 is composed of a thin film-shaped elastomer member which is made of the same material as that of the stopper member 5 and significantly reduced in wall thickness as compared with the stopper member 5. The support body 22 is integrally formed with the stopper member 5 to extend between the annular stopper surface 20 and the inner pipe 15 at two circumferentially opposed positions.

The mount body 4 has an upper surface joined to a bottom portion 2b of the upper frame 2, and a lower surface (surface on a side opposite to the upper frame 2) joined to a flat plate-shaped metal plate member 7.

A bolt 25 is integrally attached to the plate member 7. The bolt 25 is provided to protrude from the plate member 7 in a direction perpendicular to a surface of the plate member 7 under a condition that a head of the bolt 25 is buried in the mount body 4. The plate member 7 is further provided with a pin 26 having a diameter less than that of the bolt 25.

The plate member 7 is placed on an upper surface of the base portion 10 of the lower frame 3. Through this operation, the bolt 25 and the pin 26 each provided to protrude from the plate member 7 penetrate, respectively, through two holes 27, 28 (FIGS. 2 and 4) provided in each of the base portion 10 and the washer plate 8, and protrude outside the washer plate 8 (downwardly from the washer plate 8). In the illustrated embodiment, in view of an assembling error, etc., each of the holes 27, 28 is formed in a slightly elongate shape.

The bolt 25 protruding downwardly from the washer plate 8 is used to attach the lower frame 3 to the vehicle body-side member Y. Specifically, in an attaching operation for the lower frame 3, the bolt 25 is inserted into a non-illustrated mounting hole provided in the vehicle body-side member Y, and a nut or the like is screwed on a distal end thereof, so that the following three components: the plate member 7, the lower frame 3 and the washer plate 8, are collectively fastened to the vehicle body-side member Y in a superimposed manner. Through this operation, the lower frame 3 is fixed to the vehicle body-side member Y, and the mount body 4 is fixed to the lower frame 3 while interposing the plate member 7 therebetween. In conjunction with the above operation, the pin 26 is inserted into a positioning hole (illustration is omitted) of the vehicle body-side member Y to prevent rotation of the antivibration device 1.

A bolt 24 is integrally attached to a top portion 2a of the upper frame 2 to fasten the upper frame 2 to the engine-side member X. Specifically, the upper frame 2 is fixed to the engine-side member X by inserting the bolt 24 into a non-illustrated mounting hole provided in the engine-side member X, and screwing a nut or the like on a distal end of the bolt 24.

The antivibration device 1 constructed as described above is used under a condition that the upper frame 2 is fixed to the engine-side member X, and the lower frame 3 is fixed to the vehicle body-side member Y. In the above usage state, the engine is supported with respect to the vehicle body, while suppressing vibration transmission from the engine to the vehicle body.

Specifically, due to vibration of the engine, vibration causes by vehicle running, etc., a vibrational load is applied from the engine to the antivibration device 1 in various directions. The vibrational load is input into the upper frame 2, the mount body 4, the lower frame 3 and the vehicle body-side member Y, in this order. In this process, the elastomer mount body 4 is elastically deformed under the vibrational load. Thus, according to the elastic deformation of the mount body 4, vibrational energy is absorbed, and thereby vibration transmission to the lower frame 3 and the vehicle body-side member Y is suppressed.

Figure 6:
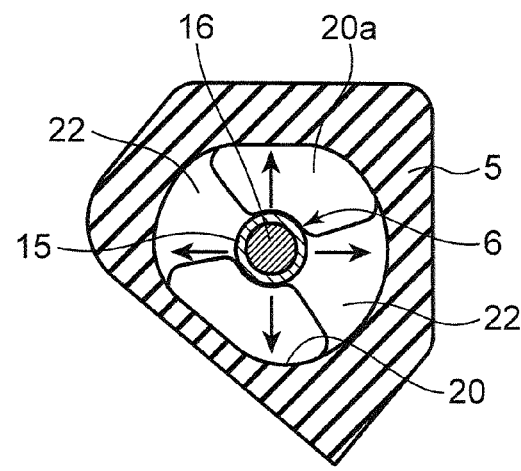
FIG. 6 is an explanatory diagram illustrating a function of the antivibration device.

When the mount body 4 is elastically deformed in the above manner, the upper frame 2 is moved with respect to the lower frame 3, so that relative positional relationship therebetween will be changed. In this case, the shaft member 6 fixed to the lower frame 3 is relatively moved with respect to the annular stopper surface 20, within the space (open hole 20a) surrounded by the annular stopper surface 20, as indicated by the arrows in FIG. 6. A direction of the movement of the shaft member 6 can be variously changed depending on directions of the load. Although the shaft member 6 and the annular stopper surface 20 are coupled together through the support body 22, the relative movement of the shaft member 6 is never disturbed by the support body 22, because the support body 22 is a thin film-shaped elastomer member, as mentioned above.

Figure 7:
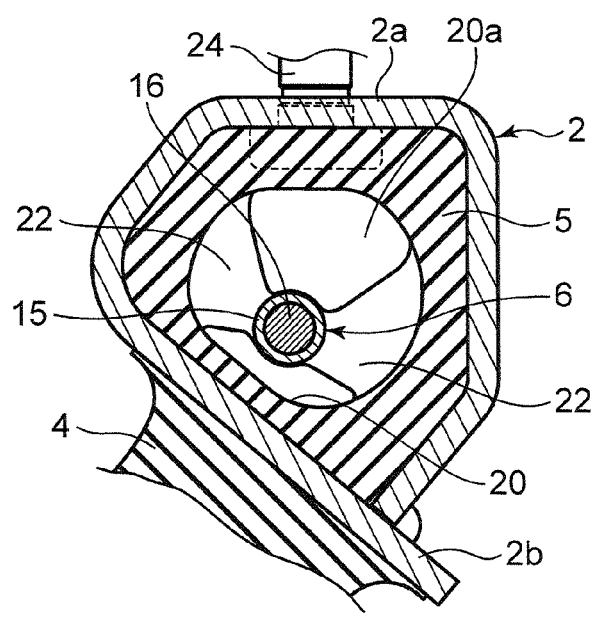
FIG. 7 is an explanatory diagram illustrating the antivibration device in a no-load state.

FIG. 5 illustrates a position of the shaft member 6 when only a load caused by the own weight of the engine is input. In this state, the shaft member 6 is located in an approximately central region of the space surrounded by the annular stopper surface 20 (in an approximately central region of the open hole 20*a*). Specifically, in a no-load state where no load is applied to the upper frame 2, as illustrated in FIG. 7, a dimensional relationship between respective ones of the components is set to allow the shaft member 6 to be located on a downward side. In this state, when a load caused by the own weight of the engine is applied to the upper frame 2, the upper frame 2 is moved slightly downwardly along with deformation of the mount body 4. Consequently, as illustrated in FIG. 5, the shaft member 6 is relatively moved to the vicinity of the central region of the open hole 20*a*.

As mentioned above, when the engine's own weight is applied from the engine, the shaft member 6 is disposed in the vicinity of the central region of the open hole 20*a*, so that a gap between the shaft member 6 and the annular stopper surface 20 (the gap will hereinafter be referred to as "stopper gap") has substantially the same values over a circumferential direction. Thus, when a vibrational load is applied to the upper frame 2 in various directions in addition to the engine's own weight, the upper frame 2 (and the stopper member 5) can be moved in any of upward, downward, rightward and leftward directions by substantially the same distance corresponding to the stopper gap.

In this case, when the vibrational load input from the engine is relatively small, the upper frame 2 can be freely moved in any direction without causing the shaft member 6 (inner pipe 15) to be brought into contact with the annular stopper surface 20. According to the movement of the upper frame 2, the mount body 4 is elastically deformed freely. Thus, vibration input from the engine is mostly absorbed by the mount body 4, and only a small part of the vibration is transmitted to the vehicle body (the vehicle body-side member Y).

On the other hand, when a fairly large vibrational load is input, for example, during vehicle running on a rough road, the upper frame 2 is moved to cause the shaft member 6 to be brought into contact with the annular stopper surface 20. Thus, the deformation of the mount body 4 is restricted, and thereby a vibrational damping effect of the mount body 4 is deteriorated. However, the restriction on deformation of the mount body 4 is a necessary measure to prevent an amount of deformation of the mount body 4 from becoming excessive. Specifically, the annular stopper surface 20 is operable, upon contact with the shaft member 6, to restrict a movement of the upper frame 2 to thereby carry out a function of suppressing an amount of deformation of the mount body 4 to prevent damage (occurrence of breaking, crack, or the like) of the mount body 4.

Meanwhile, in cases where the mount body 4 is degraded due to long-term use, the mount body 4 is more likely to be broken when a fairly large vibrational load is momentarily input during vehicle running on a rough road, etc. However, even if the mount body 4 is broken, the upper frame 2 can be moved only by a distance corresponding to the stopper gap (the gap between the annular stopper surface 20 and the shaft member 6). Thus, the positional relationship between the upper frame 2 and the lower frame 3 can be changed only by a distance corresponding to the stopper gap, so that it becomes possible to prevent the occurrence of an undesirable situation where the engine is completely separated from the vehicle body.

A process for producing the antivibration device 1 will be briefly described below. In a production process of the antivibration device 1, the upper frame 2, the plate member 7, the inner pipe 15, the bolts 24, 25 and the pin 26 are first set within a given molding die. In this state, a material (elastomer material) for the mount body 4 and the stopper member 5 is injected into the die to mold the mount body 4 and the stopper member 5 integrally with the members (2, 7, 15, 24, 25, 26). Specifically, the stopper member 5 is molded inside the upper frame 2 in such a manner as to join them together, and the mount body 4 is molded between the bottom portion 2*b* of the upper frame 2 and the plate member 7 in such a manner as to join them together. For example, the joining between the stopper member 5 and the upper frame 2, and the joining between the mount body 4 and each of the upper frame 2 and the plate member 7, may be performed by means of vulcanization adhesion.

In conjunction with the molding of the stopper member 5, the thin film-shaped support body is also molded between the stopper member 5 and the inner pipe 15. Further, the bolt 24 is integrally attached to the top portion 2*a* of the upper frame 2, and the bolt 25 and the pin 26 are integrally attached to the plate member 7.

Figure 8:
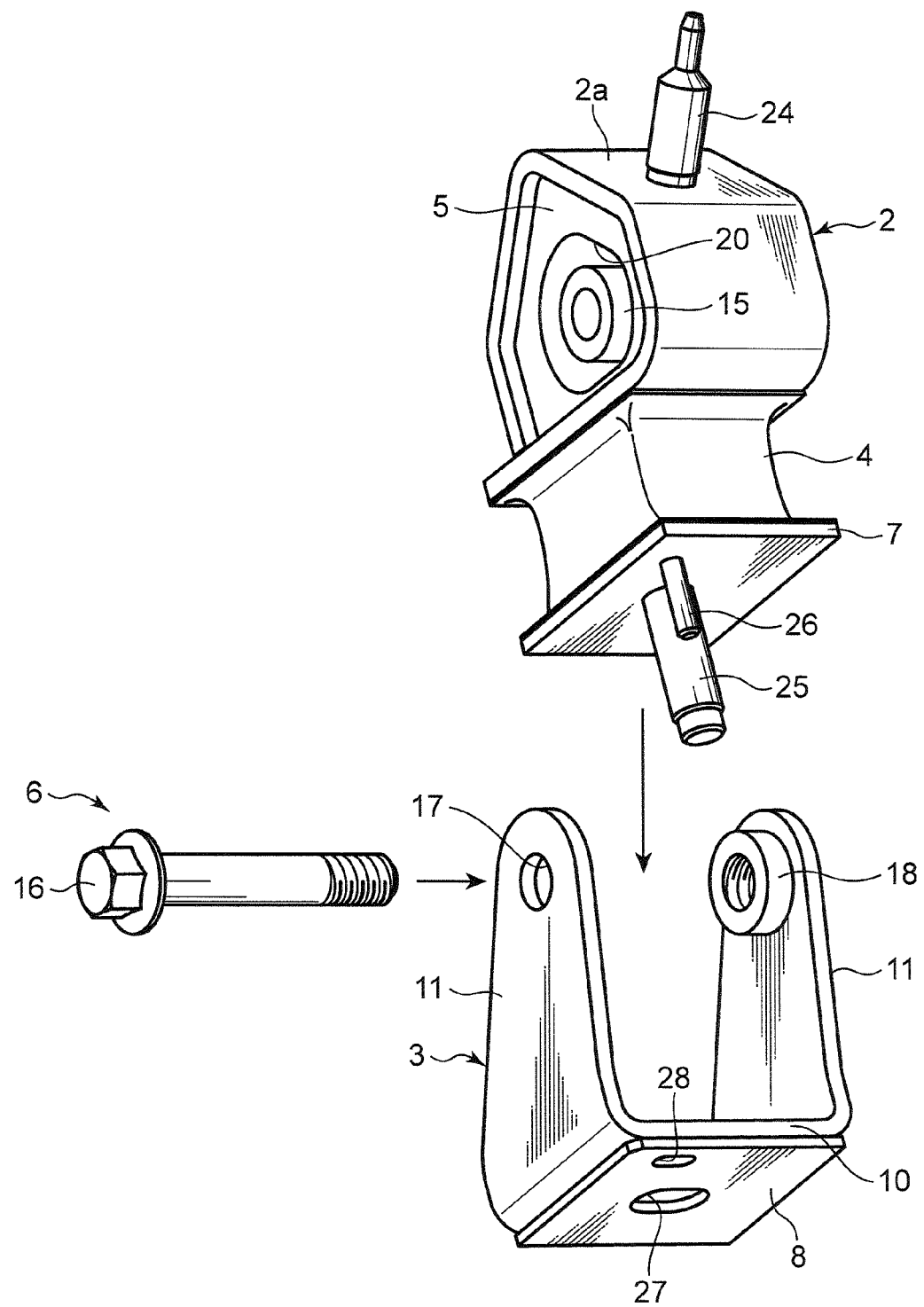
FIG. 8 is an explanatory diagram illustrating how to assemble the antivibration device.

Then, as illustrated in FIG. 8, the lower frame 3 and the washer plate 8 are installed to the components, such as the upper frame 2, the mount body 4 and the stopper member 5, integrated in the above manner. Specifically, the bolt 25 and the pin 26 protruding from the plate member 7 are inserted into respective ones of the holes 27, 28 provided in each of the base portion 10 of the lower frame 3 and the washer plate 8. Further, the through-hole 17 and the weld nut 18 of the pair of sidewall portions 11 are disposed opposed to and aligned with respective ones of the axially opposite ends of the inner pipe 15.

Then, in this state, the shank of the bolt 16 is inserted into the through-hole 17 of the sidewall portion 11 and the inner pipe 15, and the distal end of the bolt 16 is screwed into the weld nut 18. Through the above operation, the shaft member 6 comprising the inner pipe 15 and the bolt 16 is fixed between the pair of sidewall portions 11, and an assembling of the antivibration device 1 is completed.

Subsequently, in an operation of attaching the antivibration device 1 between the engine and the vehicle body, the upper frame 2 is fixed to the engine-side member X by using the bolt 24, and the lower frame 3 is fixed to the vehicle body-side member Y by using the bolt 25, as mentioned above. In this operation, according to the fastening of the common bolt 25 on the side of the lower frame 3, the following three components: the plate member 7, the base portion 10 of the lower frame 3 and the washer plate 8, are collectively fastened to the vehicle body-side member Y in a superimposed manner.

As described above, the antivibration device 1 according to the above embodiment comprises: the lower frame 3 (vehicle body-side fixing member) adapted to be fixed to the vehicle body-side member Y (vehicle body); the shaft member 6 which extends to couple between the pair of sidewall portions 11 of the lower frame 3; the upper frame 2 (engine-side fixing member) adapted to be fixed to the engine-side member X (engine) and provided between the pair of sidewall portions 11 to surround around the shaft member 6; the elastomer stopper member 5 integrally provided on the inner surface of the upper frame 2 to define the annular stopper surface 20 which surrounds the shaft member 6 while leaving a given gap (stopper gap) therebetween; and the elastomer mount body 4 provided to couple the base portion 10 of the lower frame 3 and the upper frame 2 together. This antivibration device 1 is capable of adequately absorbing a vibrational load applied from the engine in various directions, while ensuring compactness.

Specifically, in the above embodiment, the stopper member 5 integrally provided on the upper frame 2 is formed to have the annular stopper surface 20 surrounding the shaft member 6 fixed to the lower frame 3, so that the stopper gap between the shaft member 6 and the annular stopper surface 20 can be equally ensured in any direction. Thus, when a vibrational load is input from the engine, deformation of the mount body 4 is permitted in any direction by substantially the same distance corresponding to the stopper gap, so that it becomes possible to adequately absorb a vibrational load in various directions, such as upward, downward, rightward and leftward directions.

In addition, the stopper gap is defined between the shaft member 6 and the annular stopper surface 20 around the shaft member 6. Thus, in cases where it is necessary to set the stopper gap to a relatively large value, it is only necessary to adjust an inner diameter of the annular stopper surface 20 or an outer diameter of the shaft member 6 (inner pipe 15), so that it becomes possible to avoid an increase in size of the antivibration device 1. This makes it possible to sufficiently increase the stopper gap and more effectively reduce vibration to be transmitted from the engine into a passenger compartment, without causing an increase in size of the antivibration device 1.

Further, for example, even in a situation where the mount body 4 is broken due to substantial degradation of the mount body 4 and input of a fairly large vibrational load during vehicle running on a rough road, etc., the positional relationship between the upper frame 2 and the lower frame 3 can be changed only by a distance corresponding to the stopper gap, so that it becomes possible to prevent the engine from being completely separated from the vehicle body so as to reliably avoid drop-down of the engine from the vehicle body.

In the above embodiment, the antivibration device 1 is configured such that, when the mount body is deformed under the engine's own weight, the shaft member 6 is disposed in an approximately central region of a space surrounded by the annular stopper surface 20 (open hole 20a), as illustrated in FIG. 5. In the antivibration device 1 configured as above, under the condition that the engine's own weight is applied thereto, the stopper gap between the shaft member 6 and the annular stopper surface 20 is equally ensured, so that it becomes possible to adequately absorb a vibrational load when it is input in addition to the engine's own weight, irrespective of direction of the vibrational load.

In the above embodiment, the flat plate-shaped plate member 7 is integrally joined to the lower surface of the mount body 4, and, when the lower frame 3 is fixed to the vehicle body-side member Y, the plate member 7 is fastened to the vehicle body-side member Y together with the base portion 10 of the lower frame 3 (and the washer plate 8) by a common fastening mechanism. Differently, for example, from a structure in which the mount body 4 and the lower frame 3 are joined together (without interposing the plate member 7 therebetween), the antivibration device 1 constructed as above has an advantage of being able to adequately fixing the mount body 4 to the vehicle body-side member Y, while facilitating integration between the mount body 4 and the plate member 7.

For example, in a process of molding the mount body 4 within a molding die, it is possible to preliminarily set the lower frame 3 within the molding die, and join the base portion of the lower frame 3 and the mount body 4 together by means of vulcanization adhesion or the like. However, the lower frame 3 has a three-dimensional shape having the base portion 10 and the pair of sidewall portions 11, and thereby it is necessary to modify a molding die to a fairly complicated structure so as to allow the lower frame 3 to be extracted from the die after molding. In contract, in the structure where the flat plate-shaped plate member 7 is integrally joined to the mount body 4, and the plate member 7 and the base portion 10 of the lower frame 3 are collectively fastened by a common fastening mechanism, the mount body 4 can be easily integrated with the plate member 7 during molding thereof, and the lower frame 3, the plate member 7 and the mount body 4 can be adequately fixed to the vehicle body-side member Y by collectively fastening the plate member 7 and the lower frame 3 through the common fastening mechanism.

In the above embodiment, the support body 22 is provided between the annular stopper surface 20 and the inner pipe 15 of the shaft member 6 to mutually couple the stopper member 5 and the inner pipe 15. This provides an advantage of being able to easily perform an operation of inserting the bolt 16 into the inner pipe 15 and fixing the opposite ends of the bolt 16 to respective ones of the pair of sidewall portions 11, during assembling of the antivibration device 1.

For example, if the support body 22 is not provided, it is necessary to perform an operation of, after inserting the inner pipe 15 into an internal space of the stopper member 5, aligning a fastening portion (the through-hole 17 and the weld nut 18) of the pair of sidewall portions 11 of the lower frame 3 with the inner pipe 15, while manually supporting the inner pipe 15, and, in this state, inserting the bolt 16. This operation involves considerable difficulty. In contrast, in the structure where the support body 22 is provided and the inner pipe 15 is supported within the stopper member 5 through the support body 22, as in the above embodiment, it becomes possible to eliminate the need for manually supporting the inner pipe 15 so as to facilitate the insertion of the bolt 16.

Particularly in the above embodiment, the support body 22 consists of an elastomer member made of the same material as that of the stopper member 5, so that it becomes possible to mold the support body 22 in conjunction with molding of the stopper member 5. In addition, the support body 22 is formed in a thin film shape. Thus, during use of the antivibration device 1, the relative movement of the shaft member 6 with respect to the annular stopper surface 20 is never disturbed by the support body 22, so that it becomes possible to adequately maintain performance of the antivibration device 1 while ensuring assembleability of the antivibration device 1.

In the above embodiment, the support body 22 is formed between the annular stopper surface 20 and the inner pipe 15 to improve efficiency of the assembling operation of the antivibration device 1. However, in cases where the efficiency of the assembling operation can be ensured by other measures (for example, the use of a jig), the support body 22 may be omitted.

In the above embodiment, in view of molding performance, the flat plate-shaped plate member 7 is integrally joined to the lower surface of the mount body 4 during molding of the mount body 4, and, when the antivibration device 1 is fixed to the vehicle body, the mount body 4 and the lower frame 3 are fastened to the vehicle body-side member Y through the plate member 7. Alternatively, the base portion 10 of the lower frame 3 may be directly joined to the lower surface of the mount body 4 by means of vulcanization adhesion or the like. In this case, for example, it is contemplated that a raw material of the lower frame 3 is integrated with the mount body 4 before bending the lower frame 3 (to form the base portion 10 and the pair of sidewall portions 11), and then the raw material of the lower frame 3 is subjected to the bending.

Finally, based on the content of the above embodiment described as one example of the present invention, an outline of features and effects of the present invention will be described below.

The present invention provides an antivibration device which is designed to be provided between an engine and a vehicle body so as to mount the engine on the vehicle body while dampening vibration of the engine. The antivibration device comprises: a vehicle body-side fixing member which has a base portion adapted to be fixed to the vehicle body, and a pair of sidewall portions provided to protrude from the base portion in mutually opposed relation; a shaft member which extends to couple between the pair of sidewall portions of the vehicle body-side fixing member; an engine-side fixing member adapted to be fixed to the engine and provided between the pair of sidewall portions to surround around the shaft member; an elastomer stopper member integrally provided on an inner surface of the engine-side fixing member to define an annular stopper surface composed of a surrounding surface which surrounds the shaft member while leaving a given gap therebetween; and an elastomer mount body provided to couple the base portion of the vehicle body-side fixing member and the engine-side fixing member together.

In the antivibration device of the present invention, the stopper member integrally provided on the engine-side fixing member is formed to have the annular stopper surface surrounding the shaft member fixed to the vehicle body-side fixing member, so that a gap (stopper gap) between the shaft member and the annular stopper surface can be equally ensured in any direction. Thus, when a vibrational load is input from the engine, deformation of the mount body is permitted in any direction by substantially the same distance corresponding to the stopper gap, so that it becomes possible to adequately absorb a vibrational load in various directions, such as upward, downward, rightward and leftward directions.

In addition, the stopper gap is defined between the shaft member and the annular stopper surface around the shaft member. Thus, in cases where it is necessary to set the stopper gap to a relatively large value, it is only necessary to adjust an inner diameter of the annular stopper surface or an outer diameter of the shaft member, so that it becomes possible to avoid an increase in size of the antivibration device. This makes it possible to sufficiently increase the stopper gap and more effectively reduce vibration to be transmitted from the engine into a passenger compartment, without causing an increase in size of the antivibration device.

Further, for example, even in a situation where the mount body is broken due to substantial degradation of the mount body and input of a fairly large vibrational load during vehicle running on a rough road, etc., a positional relationship between the engine-side fixing member and the vehicle body-side fixing member can be changed only by a distance corresponding to the stopper gap, so that it becomes possible to prevent the engine from being completely separated from the vehicle body so as to reliably avoid drop-down of the engine from the vehicle body.

Preferably, the antivibration device of the present invention is configured such that, when the mount body is deformed under the own weight of the engine, the shaft member is disposed in an approximately central region of a space surrounded by the annular stopper surface.

According to this feature, under the condition that the engine's own weight is applied to the antivibration device, the stopper gap between the shaft member and the annular stopper surface is equally ensured, so that it becomes possible to adequately absorb a vibrational load when it is input in addition to the engine's own weight, irrespective of direction of the vibrational load.

Preferably, the antivibration device of the present invention further comprises a flat plate-shaped plate member integrally joined to a surface of the mount body on a side opposite to the engine-side fixing member, wherein the vehicle body-side fixing member, the plate member and the mount body are fixed to the vehicle body by superimposing the base portion of the vehicle body-side fixing member with respect to the plate member, and then collectively fastening the plate member and the base portion to the vehicle body by a common fastening mechanism.

This feature provides an advantage of being able to adequately fixing the mount body to the vehicle body, while facilitating integration between the mount body and the plate member.

Preferably, in the antivibration device of the present invention, the shaft member includes: a hollow cylindrical-shaped inner pipe disposed within a space surrounded by the annular stopper surface; and a rod-shaped fastening member having an axially intermediate portion inserted in the inner pipe and opposite ends each fixed to a respective one of the pair of sidewall portions of the vehicle body-side fixing member, wherein the antivibration device comprises a support body provided between the annular stopper surface and the inner pipe to mutually couple the stopper member and the inner pipe.

This feature provides an advantage of being able to easily perform an operation of inserting the rod-shaped fastening member into the inner pipe and fixing the opposite ends of the rod-shaped fastening member to respective ones of the pair of sidewall portions, during assembling of the antivibration device.

In the above antivibration device, the support body consists of an elastomer member made of a same material as that of the stopper member and formed to have a wall thickness less than that of the stopper member.

This feature makes it possible to mold the support body in conjunction with molding of the stopper member. In addition, the support body is reduced in wall thickness. Thus, during use of the antivibration device, a relative movement of the shaft member with respect to the annular stopper surface is never disturbed by the support body, so that it becomes possible to adequately maintain performance of the antivibration device while ensuring assembleability of the antivibration device.

This application is based on Japanese patent application No. 2010-276752, filed in Japan Patent Office on Dec. 13, 2010 the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An antivibration device designed to be provided between an engine and a vehicle body so as to mount the engine on the vehicle body while dampening vibration of the engine, comprising:
- a vehicle body-side fixing member which has a base portion adapted to be fixed to the vehicle body, and a pair of sidewall portions provided to protrude from the base portion in mutually opposed relation;
- a shaft member which extends to couple between the pair of sidewall portions of the vehicle body-side fixing member;
- an engine-side fixing member adapted to be fixed to the engine and provided between the pair of sidewall portions to surround around the shaft member;
- an elastomer stopper member integrally provided on an inner surface of the engine-side fixing member and having an annular stopper surface defining a penetrating hole for allowing the shaft member to pass therethrough, the annular stopper surface and an outer surface of the shaft member being spaced from each other at a predetermined gap over an entire axial length of the stopper member;
- a thin film-shaped support body provided between the annular stopper surface and the shaft member to mutually couple the stopper member and the shaft member so that the shaft member can move in a radial direction relative to the annular stopper surface; and
- an elastomer mount body provided to couple the base portion of the vehicle body-side fixing member and the engine-side fixing member together.

2. The antivibration device as defined in claim 1, which is configured such that, when the mount body is deformed under the own weight of the engine, the shaft member is disposed in an approximately central region of a space surrounded by the annular stopper surface.

3. The antivibration device as defined in claim 1, further comprising a flat plate-shaped plate member integrally joined to a surface of the mount body on a side opposite to the engine-side fixing member,
wherein the vehicle body-side fixing member, the plate member and the mount body are fixed to the vehicle body by superimposing the base portion of the vehicle body-side fixing member with respect to the plate member, and then collectively fastening the plate member and the base portion to the vehicle body by a common fastening mechanism.

4. The antivibration device as defined in claim 1, wherein the shaft member includes: a hollow cylindrical-shaped inner pipe disposed within a space surrounded by the annular stopper surface; and a rod-shaped fastening member having an axially intermediate portion inserted in the inner pipe and opposite ends each fixed to a respective one of the pair of sidewall portions of the vehicle body-side fixing member,
and wherein the support body is provided between the annular stopper surface and the inner pipe to mutually couple the stopper member and the inner pipe.

5. The antivibration device as defined in claim 4, wherein the support body and the stopper member are made of the same material and the support body being formed to have a wall thickness considerably less than a thickness of the stopper member in a direction parallel to an axis of the shaft member.

6. An anti-vibration device designed to be provided between an engine and a vehicle body so as to mount the engine on the vehicle body while dampening vibration of the engine, comprising:
- a vehicle body-side fixing member that has a base portion adapted to be fixed to the vehicle body and two sidewall portions protruding from the base portion in mutually opposed directions;
- a shaft member that extends to couple the sidewall portions of the vehicle body-side fixing member with each other;
- an engine-side fixing member configured to be fixed to the engine and provided between the sidewall portions to surround the shaft member;
- an elastomer stopper member integrally provided on an inner surface of the engine-side fixing member and having an annular stopper surface defining a penetrating hole for allowing the shaft member to pass therethrough, the annular stopper surface and an outer surface of the shaft member being spaced from each other at a predetermined gap over an entire axial length of the elastomer stopper member; and
- an elastomer mounted body provided to couple the base portion of the vehicle body-side fixing member and the engine-side fixing member together.

* * * * *